United States Patent [19]
Vogelenzang

[11] 3,763,638
[45] Oct. 9, 1973

[54] MOWING APPARATUS
[76] Inventor: Alexander Jan Vogelenzang, Wageningsestraat 28, Andelst, Netherlands
[22] Filed: May 10, 1972
[21] Appl. No.: 252,084

[30] Foreign Application Priority Data
May 11, 1971 Germany.................... P 21 23 369.2
Mar. 17, 1972 Germany.................... P 22 13 090.1

[52] U.S. Cl. .............................................. 56/293
[51] Int. Cl. ............................................. A01d 55/00
[58] Field of Search ..................... 56/293, 246, 247, 56/248, 17.6

[56] References Cited
UNITED STATES PATENTS
| 370,762 | 10/1887 | Bunch | 56/293 |
| 404,548 | 6/1889 | Lindestrom et al. | 56/293 |
| 426,801 | 4/1890 | Hall | 56/293 |
| 536,695 | 4/1895 | Hall | 56/293 |
| 2,724,941 | 11/1955 | Zwiesler | 56/17.6 |
| 2,793,488 | 5/1957 | Strohm | 56/293 |
| 3,517,494 | 6/1970 | Beusink | 56/293 |
| 3,514,932 | 6/1970 | Horowitz | 56/293 |
| 3,514,933 | 6/1970 | Horowitz | 56/293 |

Primary Examiner—Russell R. Kinsey
Attorney—James E. Nilles

[57] ABSTRACT

A cutter bar mower has a series of individually swingable cutters and a drive mechanism for the cutters which causes them to oscillate horizontally for cutting and to simultaneously rock back and forth sidewise so as to bring cutting edges along opposite sides of the cutters alternately into cooperative engagement with an underlying counterblade. The cutters are driven in an out-of-phase relation to each other so as to neutralize inertia forces in the longitudinal direction of the cutter bar, and the cutting edges of the cutters and counterblade are shaped to produce a slicing cut at an approximately constant cutting angle.

19 Claims, 18 Drawing Figures

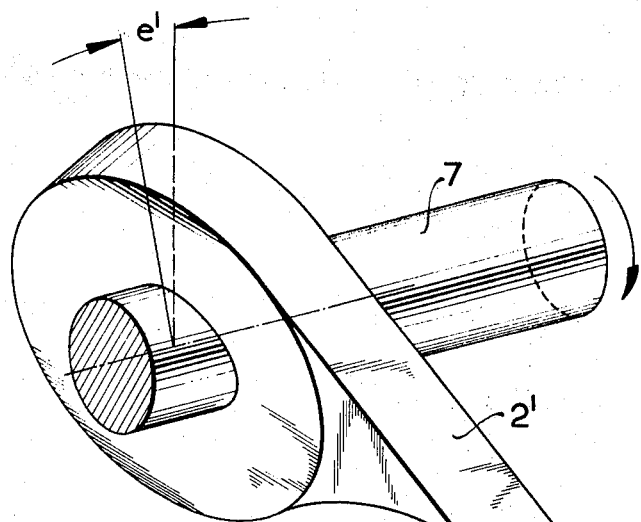
FIG.11
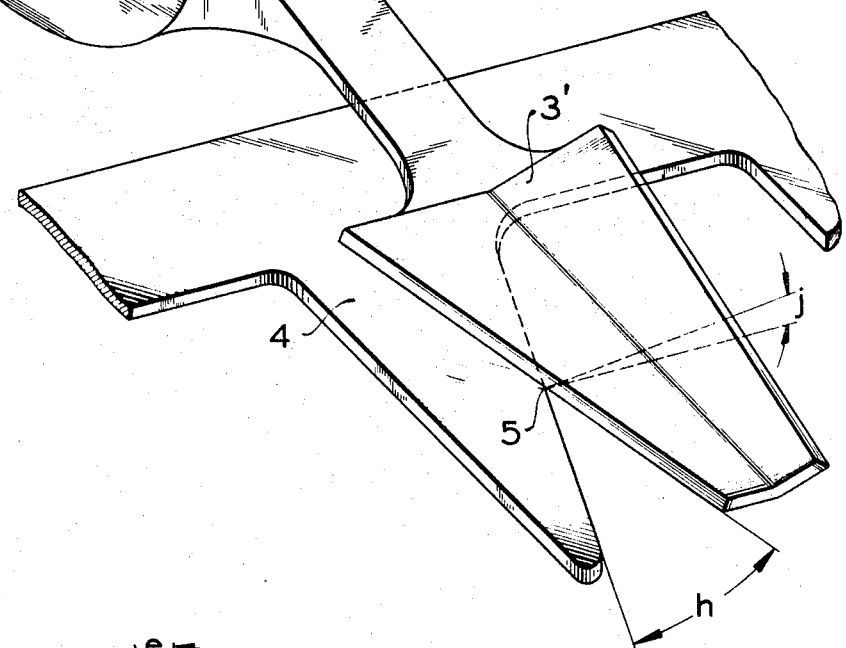
FIG.12
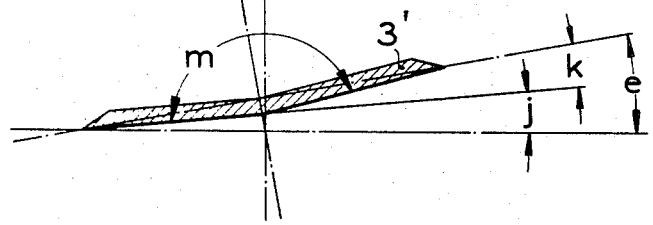

MOWING APPARATUS

This invention relates to apparatus for mowing standing crops, such as grain, corn and grass, by means of a cutter bar extending transversely to the direction of travel of the apparatus and whose cutters are set into oscillatory motions by rotation of a driving shaft extending parallel to the cutter bar and cooperating with stationary counterblades.

The principle of an oscillatory drive through which cutters are moved by rotation of a driving shaft extending parallel to the cutter bar has already been proposed in German Patent Specification No. 379,629 in relation to cutting apparatus for corn and in U. S. Pat. No. 2,724,941 in relation to a grass-mowing machine. In these proposals, the cutter holders are set into an essentially reciprocatory motion at any given time at one of their ends by a curved path or by operation of cam plates rotating with the driving shaft, are supported to swivel at about the middle of their lengths by means of fixed vertical pivot pins, and impart to the cutters an oppositely-directed reciprocatory motion sweeping over a circular arc.

The pivot pins associated with each cutter in such swivelling cutters are accompanied by frictional losses, must be lubricated and thereby reduce the efficiency of the mowing apparatus.

Due to the fact that the cutters swing or swivel in a horizontal plane extending parallel to the ground and are prevented from moving upwardly by the swivel bearing, ground unevennesses or stones easily lead to breakage of cutters or to breakages of pivot pins.

The present invention makes use of the principle of swinging or swivelling cutters, but proposes a novel drive which combines the advantages of the so-called rotary mower, especially its high travelling speed and the elimination of the danger of obstruction or blockage, with the advantages of the sickle-bar mower, namely a simple construction, good ground following and a short cutting length in the direction of travel, yet avoids the disadvantages of these mowers which as is known are the untidy cutting of the rotary mower in comparison with the sickle-bar mower, the requirement of a high drive output, the fact that grass removal with long standing crops is difficult and is dangerous for anyone standing around, whereas the sickle-bar mower often induces obstruction of the cutters, has a low travelling speed, is susceptible to stones lying on the ground, and requires regular sharpening, changing and replacement of the quickly-deteriorating cutters.

The invention originates from the realization that the use of a driving shaft extending parallel to the cutter bar substantially simplifies the conversion of a rotary motion into an oscillatory motion of the cutters as inertia forces are largely cut out and the problem of balancing is more easily solved.

One of the objects of the invention is to simplify in a mowing apparatus of the kind mentioned hereinabove which uses swinging or swiveling cutters, the conversion of a rotary motion into an oscillatory motion. In order to achieve this object, the invention contemplates to secure the cutters to the outer races of anti-friction bearings which are disposed at an inclination to the axis of a drive shaft which extends in the longitudinal direction of the cutter bar. The inner races of the anti-friction bearings are non-rotatably secured to the drive shaft at uniform spacings from each other.

A further object of the invention is to provide an improved mowing apparatus of the above outlined character wherein the cutters are held in contact with the counterblade by the transmission of torque from the drive shaft through the anti-frictional bearings. Spring means which are operatively interposed between the bearings and their associated cutters may be provided, if desired, to supplement the torque derived from the drive shaft in order to maintain adequate pressure of the cutters upon the counterblade.

A further object of the invention is to provide an improved mowing apparatus of the above mentioned character wherein the oscillatory or swinging movement of the cutters is balanced out in the longitudinal direction of the cutter bar. To that end, the invention contemplates to arrange the cutters in an out-of-phase relation to each other so that some of them will swing in one direction while the others swing simultaneously in the opposite direction and the inertia forces of the cutters are thereby neutralized.

A further object of the invention is to provide for an improved cutting action of a mower of the hereinabove outlined character. To that end, the invention contemplates an arrangement whereby the cutting angle between the cutters and counterblade is constant or at least approximately constant during a cutting stroke. Since the oscillatory movement of the cutters includes a circular component, a constant cutting angle could not be maintained if the counterblade were of sawtooth shape. According to the invention, therefore, the edges of the counterblade within the region of swing of each of the cutters are differently inclined so that these edges form a substantially constant angle in relation to the instantaneous position of the cutter when the edges of the cutter sweep thereover.

A further object of the invention is to provide a cutter and counterblade arrangement which not only affords the above mentioned improved cutting action but which also lends itself to manufacture in a simple manner and at relatively low cost.

A further object of the invention is to provide an improved mower of the above mentioned character whose cutter bar will readily adjust itself to unevenness of the traversed ground. To that end, the invention contemplates to subdivide the counterblade into several sections with a part supported on the common drive shaft and cooperating with balanced groups of cutters.

These and other objects and advantages of the invention will become apparent from the following description of embodiments of the invention shown in the accompanying drawings wherein:

FIG. 11 is a perspective representation of the modified cutter shown in FIGS. 9 and 10 and of an associated counterblade, the cutter overlapping the counterblade over half of the cutting length;

FIG. 12 is a section through the cutter shown in FIG. 11 and inclined relative to the plane of the counterblade, the cutter position of FIG. 12 corresponding to the middle cutter position in FIG. 10;

Figure 1:
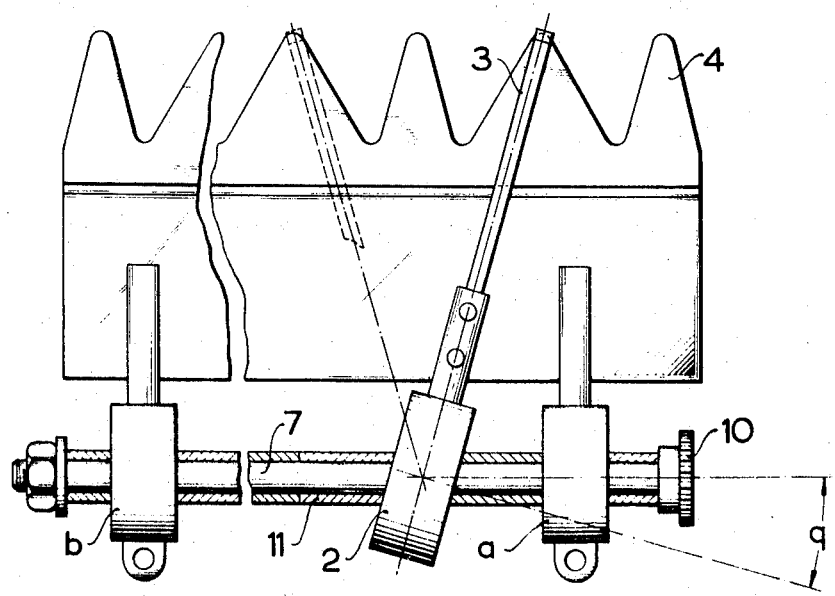
FIG. 1 is a plan view of a broken-away end part of a mower embodyiig the invention and showing only one of a series of identical cutters.
Figure 3:
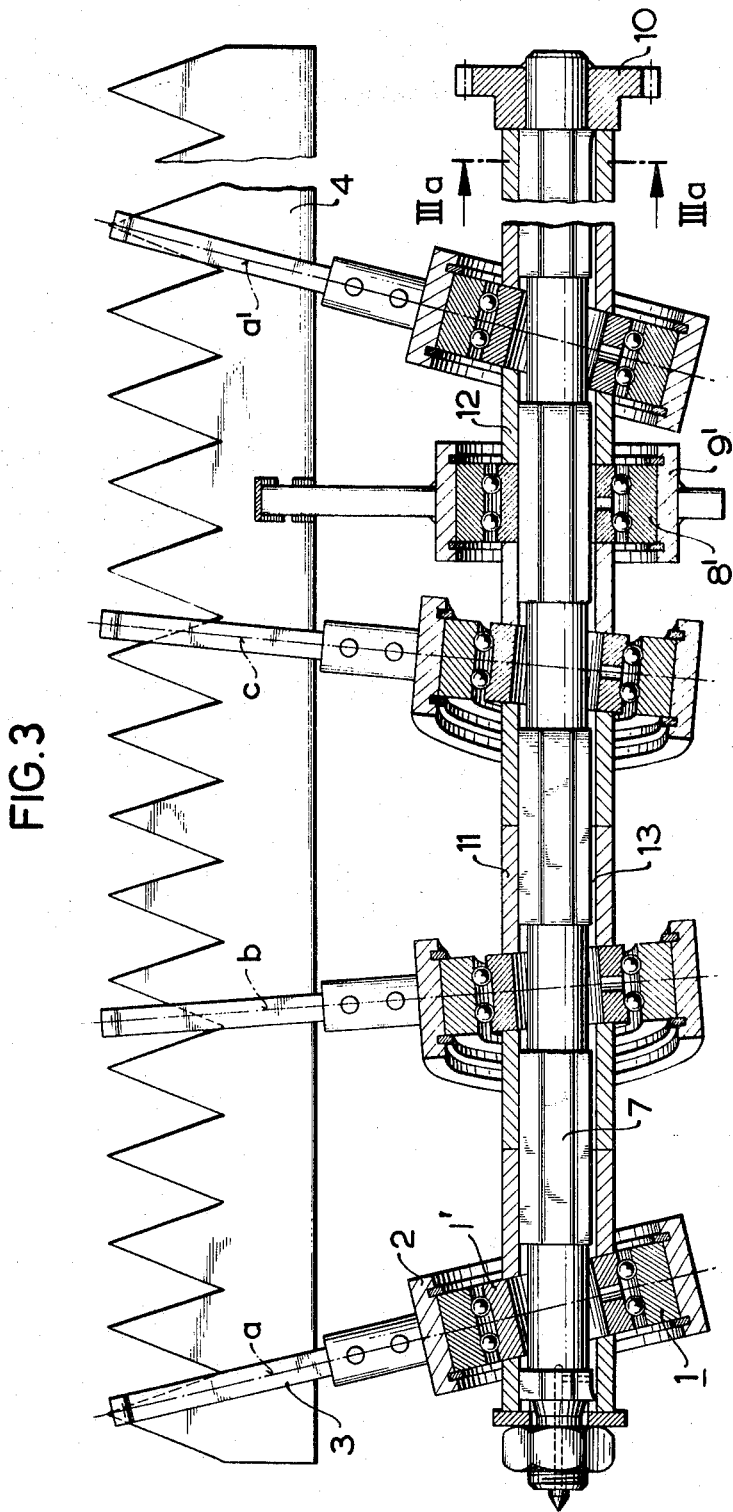
FIG. 3 is a plan view of the mower in the region of four adjacent cutters supported at angularly displaced positions relative to one another.
Figure 3B:
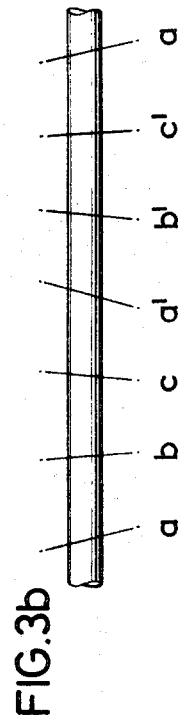
FIG. 3B is a diagram of instantaneous positions of a series of cutters along a cutter bar.
Figure 3A:
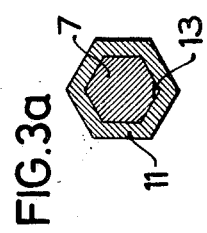
FIG. 3A is a section on line A—A of FIG. 3.

Referring to FIG. 1, a driving shaft 7 of hexagonal cross-section according to FIG. 3A carries at its ends two antifriction bearings $a$, $b$, whose outer races are connected with a counterblade 4 provided with teeth and which is pressed against the ground by torque derived from rotation of the driving shaft.

Between these bearings a and b for the counterblade, cutters 3 are secured to the outer races 2 of antifriction bearings 2 (FIG. 3) disposed at an angle $q$ (FIG. 1) inclined to the axis of the driving shaft 7. The inner races 1'(FIG. 3) of the bearings 1 are held at this angle $q$ by spacer bushings 11 secured fast against rotation on the driving shaft 7 pressed axially against said inner races so that the latter take part in the movement of the driving shaft 7.

The driving shaft 7 is driven in such a direction of rotation that there is exerted on the outer rings 2, which are stationary in relation to the rotary movement of the driving shaft, a torque which presses the cutters 3 against the counterblade 4. The cutters 3 execute together with the associated outer rings 2 a tumbler or wobbling movement during which the cutters remain pressed against the counterblade although twisting about their longitudinal axes through the angle $q$ during a working stroke.

As shown in FIG. 3, the inner races 1' of the ball bearings 1 are sequentially arranged along the driving shaft so as to occupy positions of progressive rotary displacement in the direction of rotation of the driving shaft. The angular out-of-phase relationship of the cutters connected with the outer races of the bearings 1 is so coordinated with the length of the cutter bar and the number of cutters that in the course of one revolution of the driving shaft the number of cutters at any time performing a counterclockwise stroke is the same as the number of cutters simultaneously performing a clockwise stroke. FIG. 3B illustrates schematically that the angular out-of-phase cycle is repeated after every sixth cutter. The angular out-of-phase cycle may however extend even over the whole length of the cutter bar, whereby there is a uniform movement of adjacent cutters.

According to FIGS. 3 and 3A use is made of a hexagonal shaft 7 on to which are pushed one at a time two consecutive spacer sleeves 11 which are angularly offset relative to one another by 60°. In the region of each oblique antifriction bearing, the driving shaft 7 is milled off to about the circular base diameter of the hexagonal shape so that the bearings 1 can be canted by as much as the angle $q$. The non-rotatable seating of the inner races 1' of the bearings 1 on the shaft 7 is effected by the spacer sleeves 11 which are provided with corresponding inclined end faces and are pressed against said inner races, the two adjacent sleeves 11 preferably being formed in halves and being pushed against one another angularly offset or out-of-phase by 60°.

Figure 4:
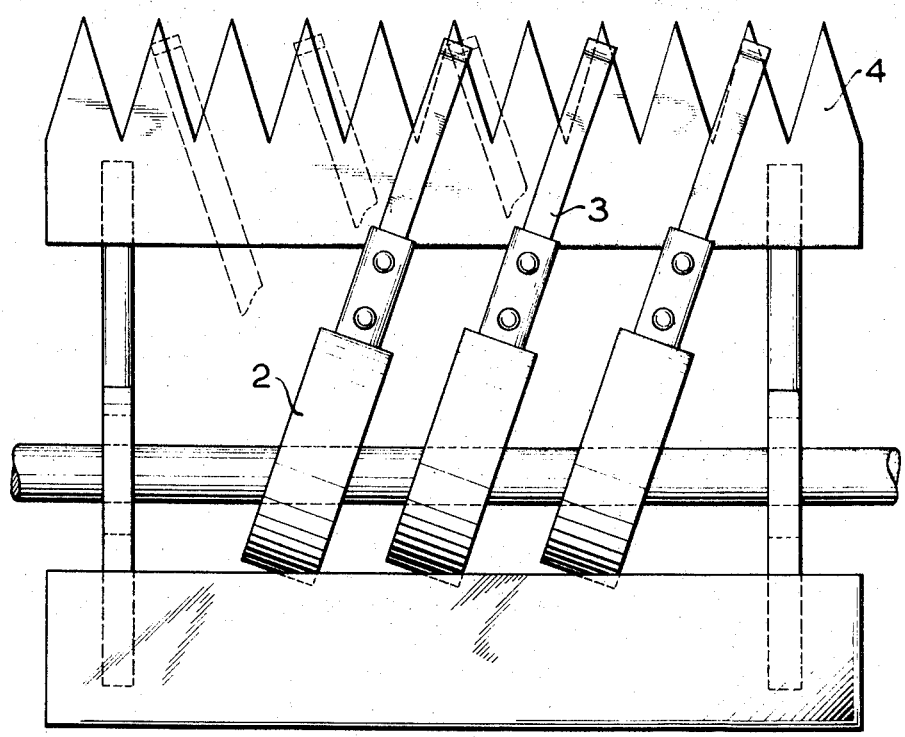
FIG. 4 is a plan view of the mower in the region of three cutters swung parallel to one another with a width of stroke overlapping one another by half.

According to FIG. 4, the distances between successive antifriction bearings 2 are selected in such a way that each cutter sweeps at any given time over half the working stroke of each of the two adjacent cutters. With this arrangement the groundspeed of the mowing apparatus can be doubled or the shaft 7 can be driven at half speed.

Figure 5:
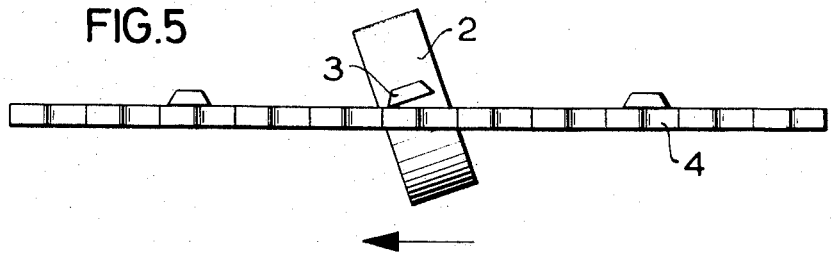
FIG. 5 is a diagramatic view from the free end of a cutter approaching the left-hand end of its oscillatory stroke.
Figure 5A:
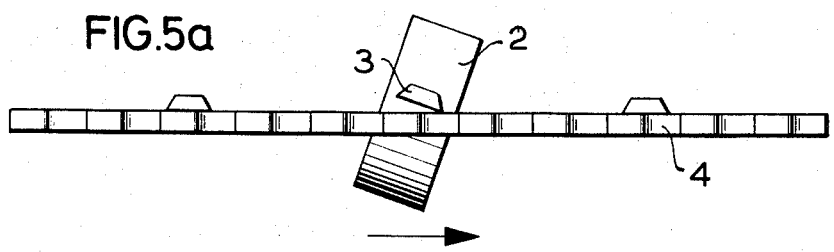
FIG. 5A is a view similar to FIG. 5 showing a cutter approaching the right hand end of its stroke.

As shown in FIG. 5, the cutters 3 are in the form of bars and have self-sharpening cutting edges in the region of the counterblade 4, said cutting edges forming in the momentary thrust direction an obtuse angle with the plane of the counterblade 4. The bars have a trapezoidal cross section in the range of coaction with the counterblade, the narrower of the two parallel sides being uppermost. Alternately, the cutters may have a triangular cross section (not shown) in which case the apexes are uppermost.

Figure 2:
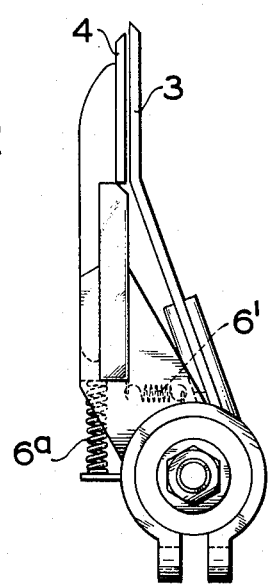
FIG. 2 is an end view of the mower shown in FIG. 1.

A continuous pressure upon the cutters 3 which forces them downward upon the counterblade 4 is achieved, according to the invention, by the particular choice of the direction of rotation in which the shaft 7 is driven. The direction in which the shaft 7 is driven by associated power transmitting mechanism, not shown, is such that the frictional forces which arise between the inner and outer races of the antifriction bearings exert a downwardly directed torque upon the associated cutters. As shown in FIG. 2, such torque may be supplemented by the contracting force of a coil spring 6 which is hooked at one end to the supporting arm of the cutter 3 and at the other end to the counterblade 4. Alternately, or additionally, a coil spring 6 may be installed in compressed condition between an arm on the outer bearing race and an abutment on the counterblade.

Figure 6:
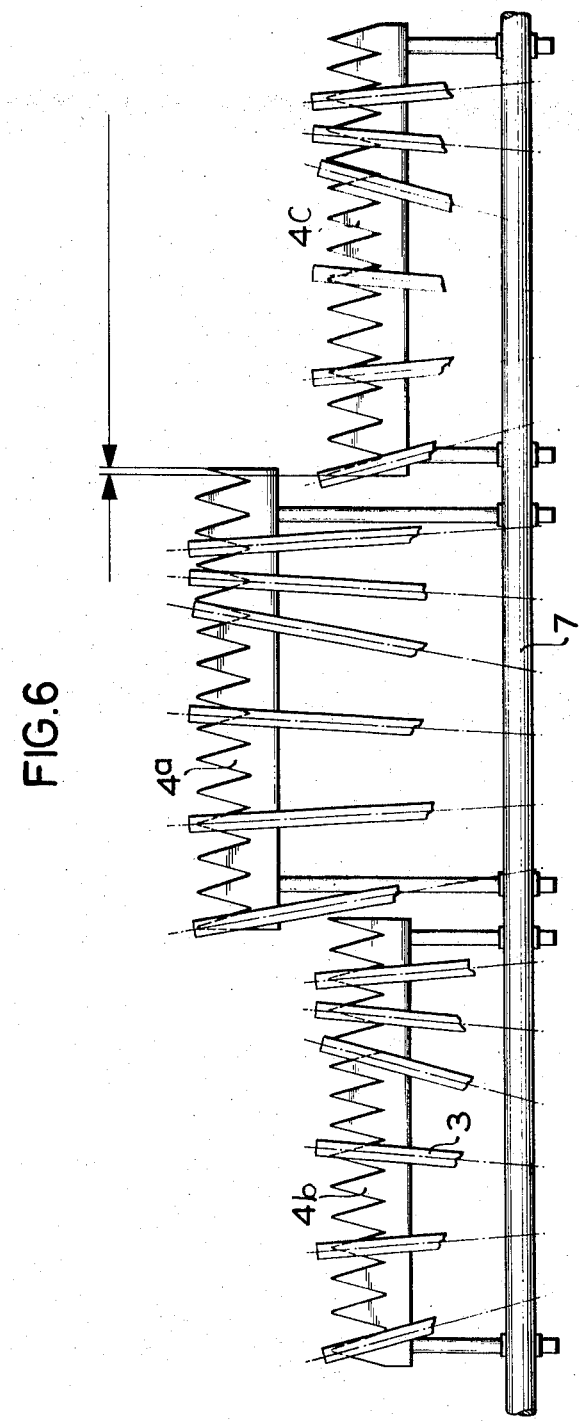
FIG. 6 is a plan view of the mower with subdivided counterblade.

FIG. 6 shows a cutter bar arrangement incorporating a multi-section counterblade. Preferably the middle section 4a projects forward in the direction of travel and slightly overlaps the ends of the adjacent counterblade sections 4b and 4c. The length of the cutters 3 coacting with counterblade section 4a is appropriately increased. The counterblade sections 4a, 4b and 4c are individually mounted on the driving shaft 7 and can thus be pressed on to the ground independently of one another, and even swung upwards independently of one another.

FIGS. 7 through 15 show a modification of the cutting mechanism shown in FIGS. 2 through 5. In the modified mechanism the cutting blade is generally designated by the reference numeral 3' and of substantially anticlinal configuration presenting a concave top face and a convex bottom face.

Figure 7:
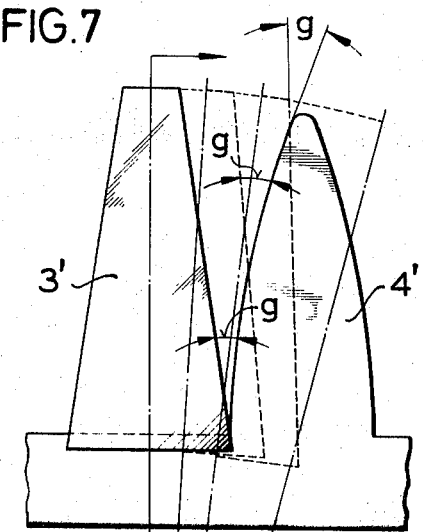
FIG. 7 is a partial plan view of a modified cutter and counterblade assembly, the edge of the counterblade across which the cutter moves being gently curved.
Figure 7:

FIG. 7 shows one of the oscillatory cutters 3' in three positions relative to one of the sickles 4' of the stationary counterblade 4 during about a quarter of a revolution of the driving shaft (not shown in FIG. 7) of the mowing apparatus. The sickles 4' of the counter-blade in this case are provided with slightly curved cutting edges so that the cutting angle g is always constant along the whole extent of cut between the oscillatory or swinging cutter 3' and the sickle 4' no matter whether the cutter is in the starting position a or has passed through the arc b or c.

Figure 8:
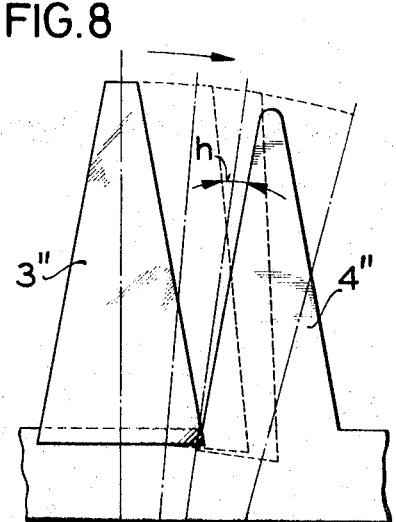
FIG. 8 is a partial plan view of another modified cutter and counterblade assembly, the edge of the counterblade across which the cutter moves being straight.
Figure 8:

For technical reasons of production, it is easier to provide the sickle of the counterblade with straight cutting edges, as is shown in FIG. 8. As a sufficiently large radius of swing of the cutter can be presumed to have been chosen, the cutting angle h changes only slightly within a limited range along the whole extent of cutting, as the cutter 3' passes from the starting position a' through the arcs b' and c' at the sickle 4. If the optimum cutting angle is placed midway between the cut starting and finishing points the angle of inclination of the sides of the triangle of the counterblade in relation to the direction of travel is obtained.

Figure 9:
FIG. 9 is a side view of a modified cutter at the moment it reverses its direction of movement.

FIG. 9 shows the position and the side-elevational shape of the anticlinal cutter 3' at the point of reversal in the oscillatory movement. Directly at the reversal of movement the cutter 3' bears upon the counterblade with the central longitudinal axis of the cutter 3' beyond the cutting edges of the counterblade. To both sides of the central longitudinal axis, the cutter halves are curved or arched to such an extent that they taper off along surfaces which are convex in themselves and which enclose with one another an obtuse angle which increases from the rear towards the front, that is, the cutter surface in cross-section is formed with a shallower bend or has a flatter curve as the forward end of the cutter is approached.

The surfaces in which the cutting edges of the cutter should taper off, diverge in front and rear portions thereof to a degree which is determined by the angle of inclination at which the cutter sweeps along the complementary cutting edge of the counterblade.

Figure 10:
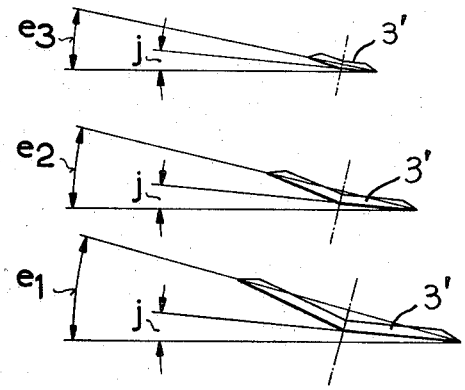
FIG. 10 shows sectional representations in three different angular positions of the modified cutter of FIG. 9; the sections being taken at right angles to the length of the cutters in one of its cutting positions and spaced from each other in the longitudinal direction of the cutter.

For purposes of analysis the point of cut may be considered at three different locations shown in FIG. 10, to which it moves progressively during a cutting stroke. The midlocation in FIG. 10 corresponds to the relative positions of the cutter and counterblade shown in FIG. 11. It will be noted that a base line which is drawn through opposite cutting edges at right angles to the longitudinal cutter axis at the height of the instantaneous point of cut (for instance 5 in FIG. 11) is, by reason of the geometrical dimensioning of the triangle, inclined relative to the plane of the counterblade, and that the extent of such inclination of the base line is less by the same degree to which the cutter is tilted during its movement through the arc C (FIG. 7) or arc C' (FIG. 8), provided that the operative cutter is continuously kept at the constant angle of attack which is designated by the reference character $j$.

Selecting at random the midposition in FIG. 10 for the determination of the obtuse angle between the planes which are to contain the cutting edges of the cutter, it will be seen that the angle e in FIG. 12 is the angle between the base line and the plane of the counterblade, and that the angle $j$ is the angle of attack at which the performing cutting edge is to be kept constant relative to the plane of the counterblade.

As, in accordance with requirements, the angle of attack $j$ should be kept onstant and the cutter is tilted back on sweeping through the arc c or c', the angle e (FIG. 12) subtended by the base line with the plane of the counterblade changes along the cutting stretch from $e1$ through $e2$ to $e3$ as indicated in FIG. 10. Since the two planes, in which the cutting edges of the cutter extend, are inclined with reference to one another by the angle $$k = e - j$$

they subtend with one another an angle $m = 180° - (e-j) = 180° - k$. The cutter tilts by the variable angle $e$ in the direction of a perpendicular erected to the plane of attack (angle $j$) during the sweep of the cutting stretch in one or the other stroke direction. Added together, there is a total tipping angle of $2e$ on sweeping both cutting stretches. Corresponding to the instantaneous tipping angle along the cutting stretch there results from this relationship the obtuse angle $m$ which the planes, in which the cutting edges extend, form at the locus of the cutting point at any given time.

Figure 13:
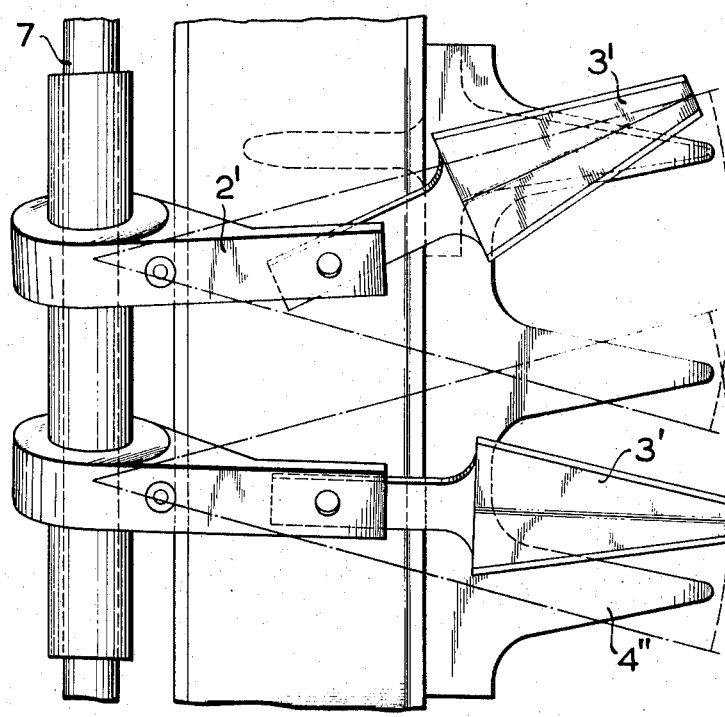
FIG. 13 is a plan view of a part of the mower with one of the modified cutters in an outswung position.
Figure 14:
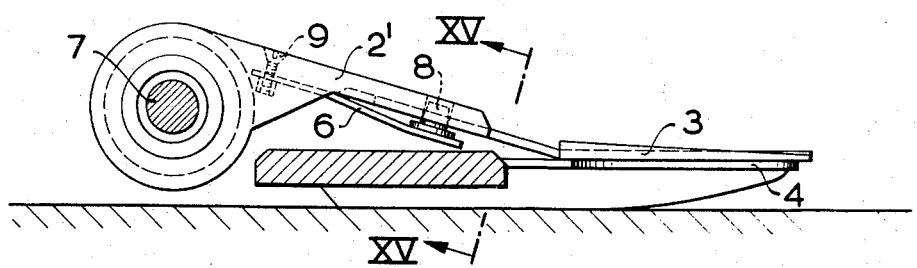
FIG. 14 is an end elevation of FIG. 13.
Figure 15:
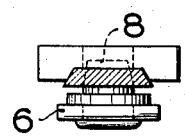
FIG. 15 is a section through the cutter holder on line XV—XV of FIG. 14.

FIG. 13 shows the position of two adjacent cutters 3' in their substantially forwardly-directed position at a middle cutting point at the counterblade. As can be seen from this figure in conjunction with FIG. 14, the cutter extends at the rear into an extension which is deflected in the direction of the driving shaft 7. The cutter is releasably secured through the extension to the cutter holder 2 supported on the driving shaft. The coupling is effected by means of a spring snap mechanism consisting of a leaf spring 6 held by a screw 9 and a conical pin 8, the lock holding the cutter in the normal aligned position shown in the lower part 4 of FIG. 13.

If a cutter strikes against a stone during its swinging movement, it swings out laterally on overcoming the spring force of the spring snap lock as shown in the upper part of FIG. 13, and is kept in this outswung position as long as the obstacle persists. When the cutter comes free of the obstacle, it snaps back into its normal aligned position through the incorporated mechanism or through the inertia inherent in the cutter combined with the resistance of the standing crop.

With reference to the cutting edges of the counterblade, it should be noted that the oscillatory cutters perform a scissor-cut motion whereby a high quality of cut is achieved. The rotary motion of the cutters about their longitudinal axes within the limited angular range brings with it the advantage that the cutting edges of the cutters are self-sharpening and the counter-blade is constantly cleaned. This rotary motion is so co-ordinated with the working stroke of each individual cutter that the angle of attack of the cutter decreases with the cutting edge executing the working stroke in relation to the plane of the counterblade during the working stroke, drops to zero towards the end of the working stroke and then reverses.

Referring again to FIGS. 7 and 8, a particularly good cutting effect is achieved if the cutting angle between cutters and counterblade is constant, as shown in FIG. 7, or at least is within a limited range as shown in FIG.

8. If the oscillatory movement of the cutters is on a circular segment, the cutting angle would not remain constant if the counterblade were saw-tooth shaped. It is particularly advantageous according to the invention therefore if the edges of the counterblade within the region of swing of each of the cutters are differently inclined such that said edges form a substantially constant angle in relation to the instantaneous position of the cutter when the edges of the cutter sweep thereover.

According to the invention, the cutting edges of the counterblade are provided within the region of swing with unequal angles in relation to the direction of travel. The counterblade must in this case be provided with alternating broad and narrow sickles or fingers. In this connection it has been shown that during mowing the standing crops are pressed downwardly in the forward direction at the broad sickles whereby longer stubbles remain behind. In order to avoid this, a further preferred feature of this invention is provided.

For production purposes, it is desirable to use unitarily-formed narrow counterblades which are so formed that a favorable cutting angle is maintained when the cutters sweep over the edges of the counterblade along the so-called cutting stretch, that is between their cut starting and cut finishing positions. In order to accomplish this, the swinging or oscillatory cutters, as shown in FIGS. 9–12, have the form in plan view of isosceles triangles and their cutting edges are at the outer edges of two surfaces which are convex in themselves symmetrically about the central longitudinal axis of the cutter and which form with one another in the cross-section of the cutter an obtuse angle which increases as the forward end of the cutter is approached by the angle of tilt brought about on sweeping of the cutter over the cutting stretch at one edge of the counterblade.

If, with this shaping of the cutter in the region of the cutting stretch at which the cut has just been described, an arc of a circle is drawn lying in the plane of the counterblade about the swivel point lying in the driving shaft, and if a tangent to this arc is placed through that part of the cutting edge of the cutter first coming into contact with the edge of the counterblade, all tangents along the cutting stretch are under the consideration that the cutter tilts on sweeping over the cutting stretch always presenting the same angle of attack to the plane of the counterblade.

The surfaces which are in themselves concave or curved must however also form an abtuse angle with one another, as designated by the reference character m in FIG. 12, so that on a working stroke in the opposite direction, the opposed cutting edge is applied to the counterblade under the same conditions, especially under the same angle of attack. According to the invention, the surfaces which are concave or curved in themselves are preferably also curved upwardly to different degrees at the central longitudinal axis of the blade, that part of the surface adjoining the forward end of the cutter being bent upwardly to a lesser degree about the angle of tilt of the cutter on sweeping over the cutting stretch than is that part of the surface adjoining the trailing end of the cutter.

The surfaces which are in themselves convex or curved may however in accordance with a modification of the invention be such that the cutter is axially symmetrically concave on both sides of its central longitudinal axis and the radius of curvature of the cutter surface increases as the forward end of the cutter is more closely approached.

It should be understood that it is not intended to limit the invention to the hereindisclosed forms and details of construction but that it embraces such other forms and arrangements as may be apparent to one skilled in the art.

I claim:

1. In a mowing apparatus, a cutter bar assembly comprising a horizontal drive shaft extending transversely of the direction of propulsion of the mower, a series of independently movable cutter elements spaced along and positioned at one side of said drive shaft; each of said cutter elements having an elongated body portion presenting a pair of cutting edges extending, respectively, lengthwise and at opposite sides thereof, power transmitting means operatively interposed between said drive shaft and each of said cutter elements, said power transmitting means being constructed and arranged so that upon rotation of said drive shaft in one direction each of said cutter elements will be swung arcuately back and forth in a horizontal plane and simultaneously be rocked about its longitudinal axis so that the leading cutting edge of each cutter element will be depressed during its horizontal swinging movement in either direction; and a counterblade assembly underlying said cutter elements in cooperative relation thereto.

2. A cutter bar assembly as set forth in claim 1, wherein said power transmitting means comprise a series of radially inner bearing elements non-rotatably secured to longitudinally spaced portions, respectively, of said drive shaft in oblique positions so that the axes of said inner bearing elements will intersect the axis of said drive shaft at an angle; radially outer bearing elements operatively associated, respectively, with said inner bearing elements in rotatable, axially non-tiltable relation thereto, and means rigidly connecting said cutter elements to said outer bearing elements, respectively, in radially spaced relation thereto.

3. A cutter assembly as set forth in claim 2, and further comprising spring means operatively interposed between each of said cutter elements and said counterblade so as to bias said cutter elements toward said counterblade in the direction of rotation of said drive shaft.

4. In a mowing apparatus, a cutter bar assembly comprising a rotary drive shaft extending transversely of the direction of propulsion of the apparatus, a series of antifriction bearings each having an inner race, an outer race and antifriction bodies therebetween retaining said inner and outer races in rotary, axially non-tiltable relation to each other, means non-rotatably securing said inner races at predetermined spacings from each other to said drive shaft and in laterally inclined relation thereto so as to present the axes of said bearings at predetermined angles, respectively, to the axis of said drive shaft, a series of cutters rigidly secured, respectively, to the outer races of said anti-friction bearings, and a counterblade assembly swingably mounted on said drive shaft in underlying relation to said cutters.

5. A cutter bar assembly as set forth in claim 4 wherein the inner races of successive antifriction bearings are secured to said drive shaft in positions of progressive rotational displacement relative to each other.

6. In a mowing apparatus, a cutter bar assembly comprising a series of cutter elements each having an elongated body portion presenting a pair of cutting edges extending, respectively, lengthwise and at opposite sides thereof; means operatively mounting said cutter elements for arcuate back and forth swinging movement in a horizontal plane, and a counterblade assembly underlying said cutter elements in cooperative relation thereto, said cutter elements comprising a bar member of trapezoidal cross section presenting a wide horizontal bottom face and a narrow horizontal top face.

7. In a mowing apparatus, a cutter bar assembly comprising a series of cutter elements each having an elongated anticlinal body portion presenting a concave upper side and a convex lower side and a pair of cutting edges on the laterally opposite, lengthwise extending portions of said body portion; means operatively mounting said cutter elements for horizontal arcuate back and forth swinging movement and for lateral rocking movement about their longitudinal axes, respectively; a counterblade assembly underlying said cutter elements in cooperative relation thereto; and actuating means for said cutter elements operative to effect said horizontal arcuate back and forth swinging movement thereof and to simultaneously rock said cutter elements about their longitudinal axes so that the leading cutting edge of each cutting element will be depressed during its horizontal swinging movement in either direction.

8. A cutter bar assembly as set forth in claim 7, wherein said anticlinal body portions of said cutter elements are tapered toward their free ends, in the direction of movement of the mowing apparatus.

9. A cutter bar assembly as set forth in claim 8 wherein said counterblade assembly comprises teeth presenting horizontally convex cutting edges.

10. In a mowing apparatus, a cutter bar assembly comprising a horizontal drive shaft extending transversely of the direction of propulsion, a plurality of endwise contiguous counterblade sections hingedly mounted on said drive shaft for up and down swinging movement relative thereto independently of each other, a series of independently movable cutter elements spaced along said shaft in overlying relation to said counterblade sections, and means connecting said cutter elements in supported and reciprocably driven relation with said drive shaft.

11. A cutter bar assembly as set forth in claim 10 wherein one of said counterblade sections is spaced forwardly from said drive shaft a greater distance than a pair of said counterblade sections contiguous to the opposite ends of said one counterblade section.

12. A cutter bar assembly as set forth in claim 10, wherein said connecting means between said cutter elements and said drive shaft include bearing means on the latter in up and down swingable relation thereto.

13. In a mowing apparatus, a cutter bar assembly comprising a series of cutter elements each having an elongated body portion presenting a pair of cutting edges extending, respectively, lengthwise and at opposite sides thereof; means operatively mounting said cutter elements for arcuate back and forth swinging movement in a horizontal plane, and a counterblade assembly underlying said cutter elements in cooperative relation thereto, said mounting means including a support, pivot means connecting said cutter elements with said support in horizontally back and forth swingable relation thereto; and yieldable locking means operatively interposed between said support and each of said cutter elements for releasably retaining the latter in operative positions on said support.

14. A cutter bar assembly as set forth in claim 13 wherein said locking means comprise a rearward extension of the respective cutter element presenting a cam face, a complementary cam face portion on said support, and spring means yieldingly urging said cam face of said cutter element extension into cooperative engagement with said complementary cam face portion of said support.

15. A cutter bar assembly as set forth in claim 14 wherein said spring means include a pivot element extending through said cutter element extension and into said support so as to afford a pivot center on which said cutter element may swing laterally out of and into operative position relative to said support.

16. In a mowing apparatus, a cutter bar assembly comprising a horizontal drive shaft extending transversely of the direction of propulsion of the apparatus, a series of independently movable cutter elements spaced along and positioned at the forward side of said drive shaft, each of said cutter elements presenting, as viewed in plan, an isosceles triangular configuration and having opposite cutting edges at the outer edges of two surfaces which are convex in themselves symmetrically about the central longitudinal axis of the cutter; power transmitting means actuated by said drive shaft and operative to swing each of said cutter elements arcuately back and forth in a horizontal plane and simultaneously rock each of said cutter elements about its longitudinal axis so that the leading cutting edge thereof will be depressed during its horizontal swinging movement in either direction; and a counter-blade assembly underlying said cutter elements in cooperative relation thereto; said convex-cutter surfaces forming with one another in the cross section of the cutter an obtuse angle which increases, as the forward end of the cutter is approached, by the angle of tilt brought about on sweeping of the cutter over the cutting stretch along the complementary cutting edge of said counter-blade assembly.

17. A cutter bar assembly as set forth in claim 16, wherein said cutter elements are axially symmetrically concave on both sides of their respective longitudinal axes and the radius of curvature of the cutter surface increases as the forward end of the cutter element is more closely approached.

18. A cutter bar assembly as set forth in claim 17, wherein the surface of each cutter element is in the form of a cut-away portion of a truncated cone the larger radius of which is associated with the surface portion adjoining the forward end of the respective cutter element.

19. A mowing apparatus comprising a cutter bar having at least one cutter element and an associated counter blade; a shaft extending along the cutter bar; bearing means including radially inner and outer bearing members mounted on said shaft at an inclination thereto; said inner bearing member being rotatable with the shaft and said outer bearing member being attached to said cutter element, and the arrangement being such that relative rotation between said shaft and cutter element in a direction causing said cutter element to be pressed on the counter blade due to drag in the bearing also causes the cutter element to move in an oscillatory path with a scissor like crop cutting action between it and the counter blade.

* * * * *